United States Patent
Berdeil et al.

(10) Patent No.: US 11,362,499 B2
(45) Date of Patent: Jun. 14, 2022

(54) HARNESS OUTLET ADAPTER OF A CABLE TRAY AND METHOD FOR INSTALLING SUCH AN ADAPTER

(71) Applicant: LATELEC, Labege (FR)

(72) Inventors: Olivier Berdeil, Toulouse (FR); Didier Cyrus, Toulouse Occitanie (FR); Jean Francois Zucchetti, Castelnau Destrefonds Occitaine (FR)

(73) Assignee: Latelec, Labege Occitanie (FR)

( * ) Notice: Subject to any disclaimer, the term of this patent is extended or adjusted under 35 U.S.C. 154(b) by 185 days.

(21) Appl. No.: 16/954,574

(22) PCT Filed: Dec. 20, 2018

(86) PCT No.: PCT/EP2018/086058
§ 371 (c)(1),
(2) Date: Jun. 17, 2020

(87) PCT Pub. No.: WO2019/122053
PCT Pub. Date: Jun. 27, 2019

(65) Prior Publication Data
US 2020/0335957 A1 Oct. 22, 2020

(30) Foreign Application Priority Data
Dec. 21, 2017 (FR) ...................... 1762716

(51) Int. Cl.
*H02G 3/22* (2006.01)
*H02G 3/04* (2006.01)
*H02G 3/18* (2006.01)

(52) U.S. Cl.
CPC ................. *H02G 3/22* (2013.01); *H02G 3/04* (2013.01); *H02G 3/18* (2013.01)

(58) Field of Classification Search
CPC .. H02G 3/22; H02G 3/04; H02G 3/18; H02G 3/24; H02G 3/26; H02G 3/28;
(Continued)

(56) References Cited

U.S. PATENT DOCUMENTS 2,365,785 A * 12/1944 Tinnerman ............. H02G 3/083
285/205
5,406,032 A * 4/1995 Clayton ................. H02G 3/083
174/664

(Continued)

FOREIGN PATENT DOCUMENTS

JP 2013230012 11/2013
WO WO2016156706 10/2016

*Primary Examiner* — Angel R Estrada
(74) *Attorney, Agent, or Firm* — Defillo & Associates, Inc.; Evelyn A. Defillo

(57) ABSTRACT

The invention relates to a cable harness output adaptor (5) for a cable tray including two semi-cylindrical half-shells (5A, 5B) made of plastic material, assembled in a complementary manner to form a cylindrical piece extending along at least one longitudinal axis (X'X) and defining two cylindrical parts (P1, P2): a first cylindrical part (P1) for internal cable harness support (3) and for externally receiving at least one clamping collar for the assembled half-shells (5A, 5B), and a second, cylindrical output part (P2) with external grip (20) of at least one protective sheath of the cable harness.

14 Claims, 4 Drawing Sheets

(58) Field of Classification Search
CPC .......... H02G 3/286; H02G 3/288; H02G 3/30; H01R 13/58; H01R 13/5808; H01R 13/5812; H01R 13/582
USPC ... 174/480, 481, 68.1, 68.3, 72 A, 650, 656, 174/659, 664, 665, 668; 248/68.1, 49, 248/74.1, 74.2, 74.3, 73
See application file for complete search history.

(56) References Cited

U.S. PATENT DOCUMENTS

| | | | |
|---|---|---|---|
| 5,908,180 A | 6/1999 | Daoud | |
| 7,422,181 B2* | 9/2008 | Sußenbach | B60T 17/046 |
| | | | 174/664 |
| 7,973,250 B2* | 7/2011 | Groeller | H02G 3/22 |
| | | | 248/68.1 |
| 8,541,699 B2* | 9/2013 | Milton | F16L 5/08 |
| | | | 174/152 G |
| 9,004,442 B2* | 4/2015 | Norris | F16C 1/108 |
| | | | 248/636 |
| 9,899,815 B2* | 2/2018 | Houvenaghel | H02G 3/083 |
| 10,992,122 B2* | 4/2021 | Stultz | B60R 16/0222 |
| 11,162,616 B2* | 11/2021 | Logan | B64D 1/00 |
| 2005/0139372 A1 | 6/2005 | Matsui | |
| 2012/0012347 A1 | 1/2012 | Zernach | |
| 2015/0083486 A1 | 3/2015 | Hill | |

\* cited by examiner

HARNESS OUTLET ADAPTER OF A CABLE TRAY AND METHOD FOR INSTALLING SUCH AN ADAPTER

CROSS REFERENCE TO RELATED APPLICATION

This application is a national stage entry of PCT/EP2018/086058 filed Dec. 20, 2018, under the International Convention claiming priority over French Patent Application No. FR1762716 filed Dec. 21, 2017.

FIELD AND STATE OF THE ART

The invention relates to an adaptor with which a cable harness portion is equipped as it exits a cable tray in order to supply electrical power to at least one piece of equipment of predefined location via a prepared path, in particular for installing electrical power supply links for the different avionics systems of an aircraft: landing gear actuators, air conditioning compressors, pressurization hydraulic pumps, engine kerosene feed pumps, deicing and ventilation actuators, power supply to instrumentation panels of the cockpit system, avionics bay computers, technical equipment (kitchen ovens, or "galleys", lighting ventilation) and domestic equipment (entertainment screens) of the cabin system networks.

The adaptors are conventionally of a single piece and made of metal, generally composed of passivated stainless steel. They contain an internal PTFE (polytetrafluoroethylene) protection to eliminate the risks of friction of the cables of the harness inside the adaptor, in particular in the vibratory conditions of the avionics environment. The cables of the harness are introduced one by one through the protections of each adaptor according to a predefined subdivision of runs in order to pre-position the cables for their installations.

Such an adaptor is illustrated in FIG. 1 by the schematic cross-sectional view of an airplane cable tray 1. In this schematic cross-sectional view, a bundle of cables 2 is held by ties 1A distributed along the cable tray 1.

Between two ties 1A, a cable harness 3 output "H" is illustrated. The harness 3 is composed of several cables distributed in a surrounding avionics system from a connector 1C coupled to the cable harness 3 at its end. The extraction of the cable harness 3 is done through a single-piece adaptor 1D borne by a stirrup 1E, this adaptor being illustrated in detail in the partial cross-sectional view of FIG. 2.

In FIG. 2, it appears that the single-piece cable harness output adaptor 1D is held in place by an "S"-shaped stirrup 1E mounted on an anchoring nut 1F. The links between the stirrup 1E on the one hand and the nut 1F or the adaptor 1D are sealed through seals 1J made of epoxy resin. Furthermore, the cable harness 3 is positioned upstream of the adaptor 1D by a holding collar 1M mounted on a metal support 1S linked to the adaptor 1D, and heat-shrinkable and/or self-amalgamating gripping tapes 1R assemble the cables 2 of the harness 3. The mechanical protection of the harness 3 is ensured by a PTFE coating 1V. At the output of the adaptor 1D, the cable harness 3 is jacketed in a protection sheath 4 against electromagnetic interferences (EMI).

SUMMARY OF THE INVENTION

The invention aims to eliminate the internal protections which make it possible to avoid the frictions of the cables inside the adaptor. Now, these protections require a wide variety of means—gripping tapes, clamping collar, epoxy resin seals—which make the implementation of the installation of the cables one by one in the adaptor according to the predetermined subdivision of runs more complex, which substantially increases the cable harness mounting and installation time. It aims also to reduce the weight of the means dedicated to the assembly of the cable harness by reducing the number of components involved in installing the adaptor.

For this, the invention provides for replacing the single-piece rigid metal transition, embodied by an adaptor of the type described above, by the joining of two complementary entities forming a transition of plastic material which grip the cable harness and position it externally.

More specifically, the subject of the present invention is a cable harness output adaptor for a cable tray comprising two semi-cylindrical half-shells made of plastic material, assembled in a complementary manner to form a cylindrical piece extending along at least one longitudinal axis and defining two cylindrical parts, a first cylindrical part for internal cable harness support and for externally receiving at least one clamping collar for the assembled half-shells, and a second cylindrical output part with external grip of at least one protective sheath of the harness.

In these conditions, the number of pieces and the weight of the adaptor are substantially reduced. According to preferred embodiments:

- the cylindrical parts comprise cylindrical internal bores of circular base along a protective strip of the harness, the internal bore of the second, cable harness output part with external grip having a diameter greater than the first, internal cable harness support part;
- the bores are coupled by a transitional bore, advantageously of linearly progressive diameter, situated in the second, cable harness output part;
- two snap-fitted positioning half-rings form a positioning ring of the adaptor coming from the half-shells at the second, external grip part;
- two snap-fitted blocking half-rings form a first blocking ring around a groove hollowed out on the cylindrical part, the blocking ring being compressed by the clamping collar;
- a second blocking ring formed by two snap-fitted half-rings is arranged between the first blocking ring and a partition serving as support arranged between the two parts of the adaptor;
- the second, cable harness output part forms an angle of between 0 and 90° with the first, internal support part;
- the second, cable harness output part is coupled to two cable harness protection sheaths, a metal sheath and an EMI protection sheath, advantageously equipped with an overbraiding;
- the plastic material consists of additive layers produced by 3D printing and covered with a metal EMI protection deposition;
- the cable harness protection strip at the internal bores consists of a material chosen from among a textile sheath, a heat-shrinkable material and a self-amalgamating material.

Another subject of the invention is an aircraft equipped with cable trays and adaptors as defined above in order to distribute cable harnesses at the output of the cable trays to the different avionics systems in order to supply them with electrical power.

The invention relates also to a method for installing such a cable harness adaptor at the output of a cable tray. This method comprises the following successive steps:

making up the harness by selecting cables of the cable tray;

jacketing a portion of the cable harness with a protection strip, of a length greater than the length of the adaptor, at a location predefined by the final positioning of the adaptor;

assembling the two half-shells of the adaptor around the protection strip;

fitting at least one protection sheath over the cable harness at the output of the adaptor by coupling gripped on the second, cable harness output part and introducing the cable harness into an orifice of a partition serving as support;

positioning the adaptor in the orifice of the partition such that the positioning ring of the second, cable harness output part comes into contact against a first face of the partition;

snap-fitting the two blocking half-rings to form the blocking ring in the groove of the first, internal cable harness support part and consolidating the positioning of the adaptor by pressing this blocking ring against the second face of the partition, and compressing the blocking ring by the clamping collar.

Advantageously, two half-rings of a second blocking ring are snap-fitted around the first, internal cable harness support part between the partition and the first blocking ring so that the fitting by snap-fitting of the first blocking ring clamps the second blocking ring against the second face of the partition. In particular, this clamping can be provoked by the pressure exerted on inclined complementary walls of the two blocking rings.

DESCRIPTION OF THE FIGURES

Other aspects and particular features of the implementation of the invention will become apparent on reading the following detailed description, accompanied by attached drawings which represent, respectively.

DETAILED DESCRIPTION

Identical reference symbols used in the different figures relate to one and the same element. The term "longitudinal" qualifies elements extending along a main direction or dimension.

Figure 1:
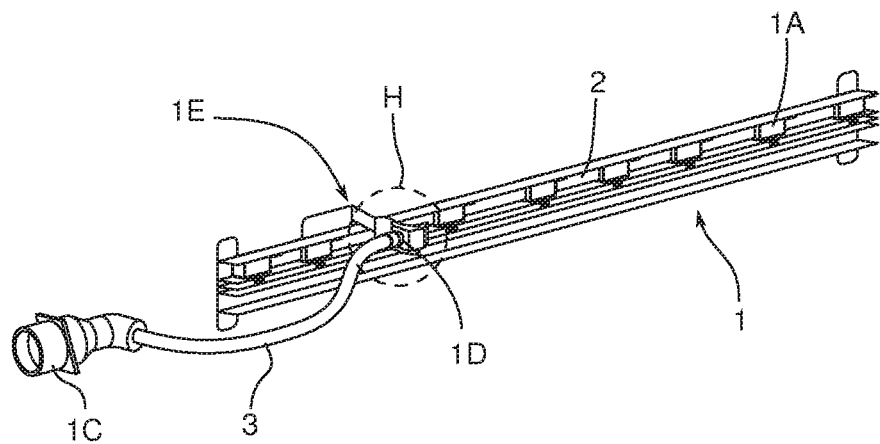
FIG. 1 shows a partial cross-sectional view of a cable tray output adaptor according to the state of the art.
Figure 2:
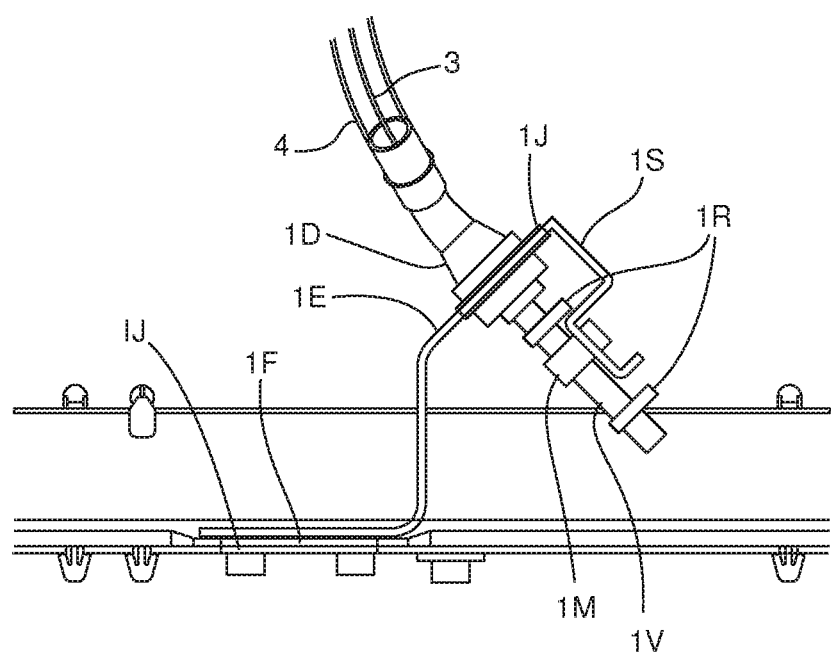
FIG. 2 shows a partial cross-sectional view of a cable harness output adaptor according to the state of the art.
Figure 3:
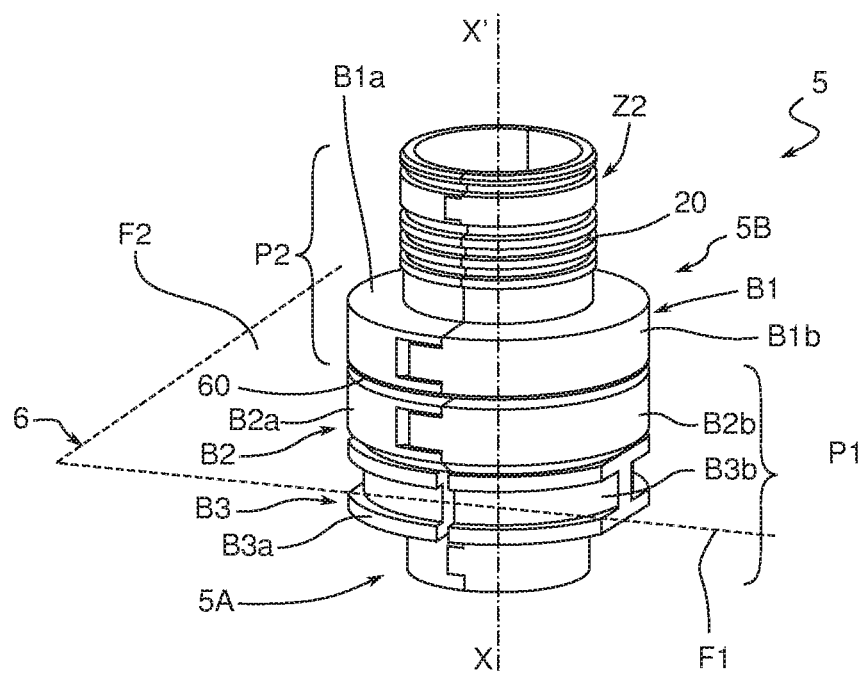
FIG. 3 shows a perspective view of an example of adaptor according to the invention after the assembly of its two half-shells.

Referring to the perspective view of FIG. 3, the example of adaptor 5 according to the invention is illustrated after the assembly of its two half-shells 5A and 5B, then having a cylindrical outer surface of linear longitudinal axis X'X. The duly assembled adaptor 5 is broken down into a first part P1 for internal support of a cable harness coming from the bundle of cables 2 (see FIGS. 1 and 2) extended by a second, cable harness output part P2 with external grip.

The shells 5A and 5B and the external rings B1 to B3 are made of plastic material produced by 3D printing in additive layers (method called "ALM", the acronym for "Additive Layer Manufacturing"). This material is capable of withstanding high temperatures, advantageously higher than 175° C., and is preferably covered with an EMI protection layer of copper-plated nickel.

The second, output part P2 comprises a positioning ring B1 molded with the part P2, this positioning ring B1 consisting of two snap-fitted half-rings B1a and B1b, coming from the half-shells 5A and 5B, to position the adaptor 5 against the face F1 of the flat partition 6 serving as support for the adaptor, once introduced into an orifice 60 of the partition 6.

The first, internal cable harness support part P1 comprises two blocking rings B2 and B3, each of these rings B2 and B3 consisting of two half-rings, B2a, B2b and B3a, B3b. These blocking rings B2 and B3 are fitted on this part P1 by snap-fitting, after the introduction of the first part P1 through the partition orifice 60, to consolidate the positioning of the adaptor 5 by pressing against the second face F2 of the partition 6.

This second part P2 also has, in its output end zone with circular base Z2, a threading 20 to couple this end zone Z2 to metal protection and EMI protection sheaths 4 (see diagram 6 of FIG. 6) with, advantageously, an outer overbraiding.

Figure 4:
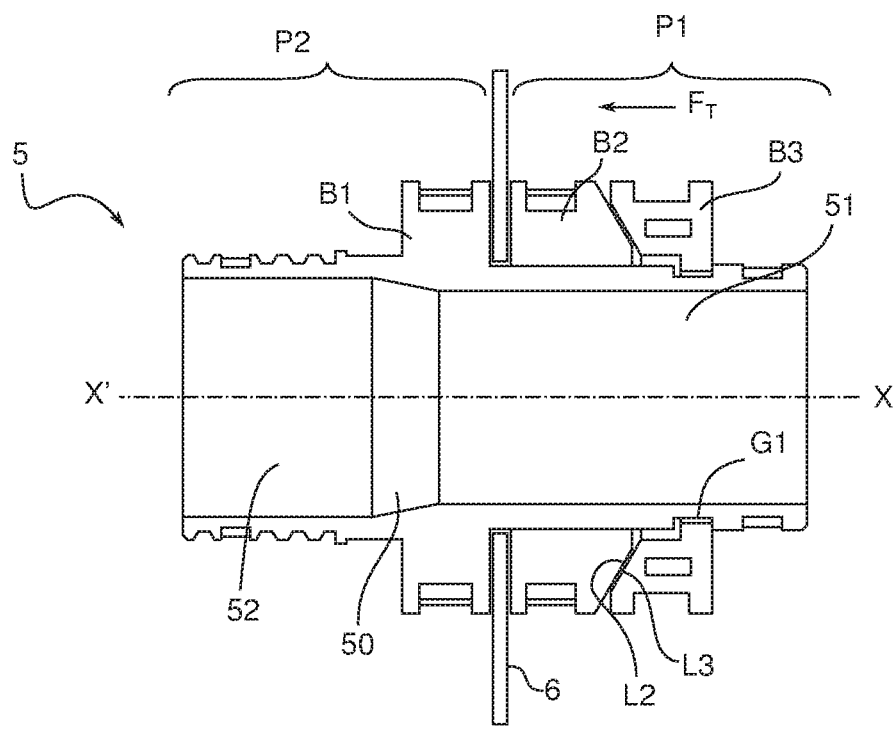
FIG. 4 shows a cross-sectional view of the example of adaptor according to the preceding figure.

Seen in cross section according to FIG. 4, the first and second parts P1 and P2 of the adaptor 5 each have a cylindrical bore of circular base 51 and 52, the cable harness output bore 52 advantageously having a diameter greater than that of the internal cable harness support bore 51. A bore 50 of linearly variable diameter, situated in the second part, preferably ensures the transition between the bores 51 and 52.

This FIG. 4 also shows the ring B1 for positioning against the partition 6, as fitted on the surface of the second part P2 of the adaptor 5, and the rings B2 and B3 for blocking against the partition 6, as fitted to the surface of the first part P1 of the adaptor 5. The blocking rings B2 and B3 have parallel lateral faces L2 and L3 inclined so that, when the half-rings forming the ring B3 are snap-fitted in the groove G1, the ring B3 exerts a lateral translational pressure (arrow $F_T$) on the ring B2 which then presses against the partition face 6. This mechanism is also detailed with reference to FIG. 7.

Figures 5A, 5B:
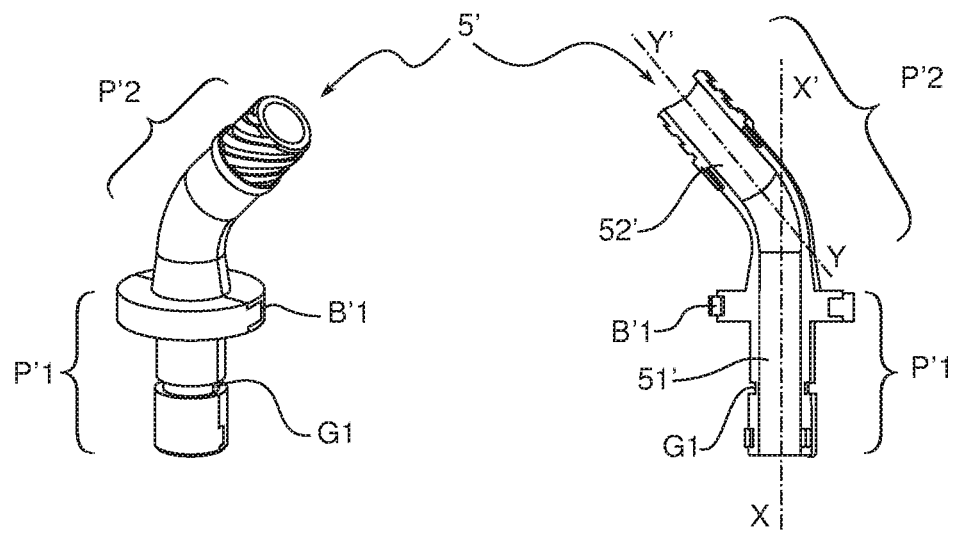
FIG. 5a shows a perspective a view of an example of adaptor according to the invention with 45° cable harness output.
FIG. 5b shows cross-sectional view of an example of adaptor according to the invention with 45° cable harness output.

Another example of adaptor 5' according to the invention is illustrated by the perspective and cross-sectional views of FIGS. 5a and 5b. This adaptor 5' is bent at the output to 45°, the angle formed by the longitudinal axes X'X and Y'Y, respectively of the first P'1 and second P'2 parts of the adaptor 5'. These FIGS. 5a and 5b show the positioning ring B'1 of the second part P'2, and the groove G1 in which a blocking ring is fitted, such as the ring B3 of the part P1 of the adaptor 5 (see FIGS. 3 and 4). In addition, the cylindrical bore 52' of the second part with external grip P'2 advantageously has a diameter greater than that of the cylindrical bore 51' of the first, cable harness support part P'1.

More generally, orientations of the second part P'2 of the adaptor 5' relative to the first part P'1 can be achieved, in particular by 3D printing (additive layer manufacturing ALM method), within a wide range, for example from a straight output at 0° (as illustrated by the adaptor 5 of FIGS. 3 and 4) and up to approximately 90°, even beyond.

Figure 6:
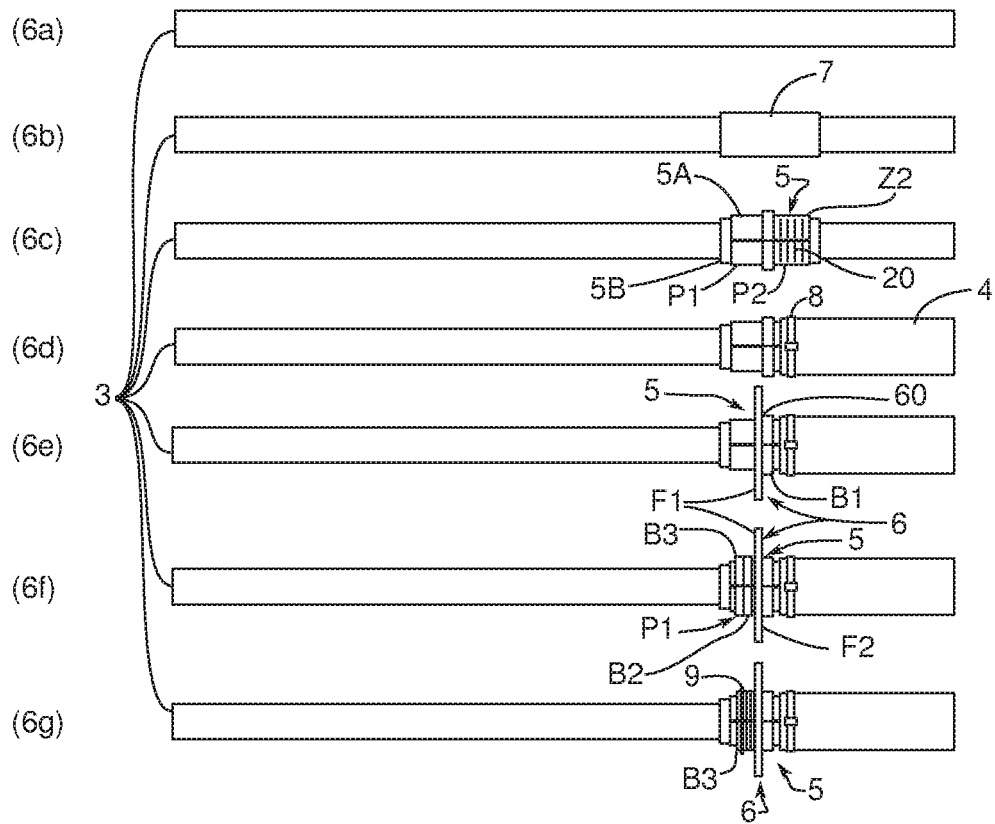
FIG. 6 shows schematic views (diagram 6a to 6g) of an example of implementation of the main steps of the method for installing a cable harness output adaptor according to the invention.

An example of implementation of the main steps of the inventive method for installing an adaptor, such as the adaptor 5 with straight output (see FIGS. 3 and 4), is illustrated by the different schematic views (diagrams 6*a* to 6*g*) of FIG. 6.

After having made up the cable harness 3 by selecting cables from the cable tray 1 (see FIGS. 1 and 2), as illustrated in the diagram 6*a*, a portion of the cable harness 3 is jacketed by a protection strip, a heat-shrinkable sheath 7 in the example of implementation (diagram 6*b*). This sheath 7 is positioned on a location predefined by the final positioning of the adaptor 5.

In the next diagram (diagram 6*c*), the two half-shells 5A and 5B of the adaptor 5 are snap-fitted around the protective sheath 7 of a length slightly greater than the length of the adaptor 5, which ensures a protection beyond the ends of the adaptor 5. Then (diagram 6*d*), outer metallic protection and EMI protection sheaths 4 with overbraiding are coupled to the adaptor 5 engaged on the threading 20 formed in the end zone Z2 of its part P2. The outer sheaths 4 are then fitted in position by a clamping collar 8.

Referring to the diagram 6*e*, the adaptor 5 is introduced into the orifice 60 of the partition 6 serving as support until the positioning ring B1 comes into contact against the face F1 of the partition 6. The next step (diagram 6*f*) consists in snap-fitting the half-rings to form the blocking rings B2 and B3 on the first part P1 and thus consolidate the position of the adaptor 5 by a clamping on the two faces F1 and F2 of the partition 6. In the last step (diagram 6*g*), the blocking ring B3 is slightly compressed by a clamping collar 9 in order to finalize the securing of the adaptor 5 on the partition 6.

Figure 7:
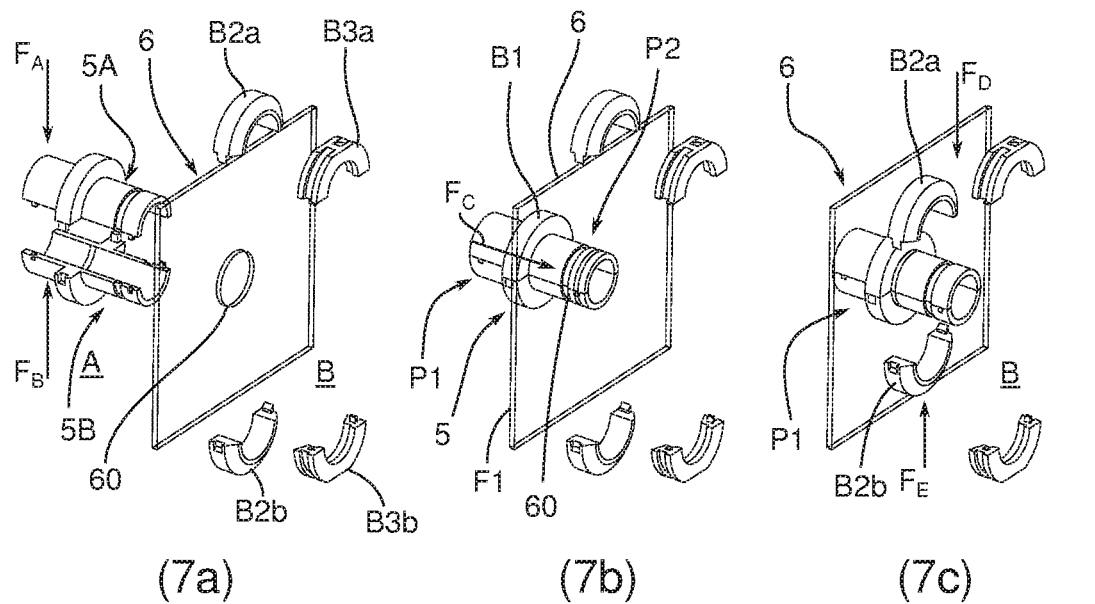
FIG. 7 shows views of different phases (diagrams 7a to 7f) of assembly and of positioning of the adaptor against the partition serving as support in the final steps of the installation method according to FIG. 6.
Figure 7:
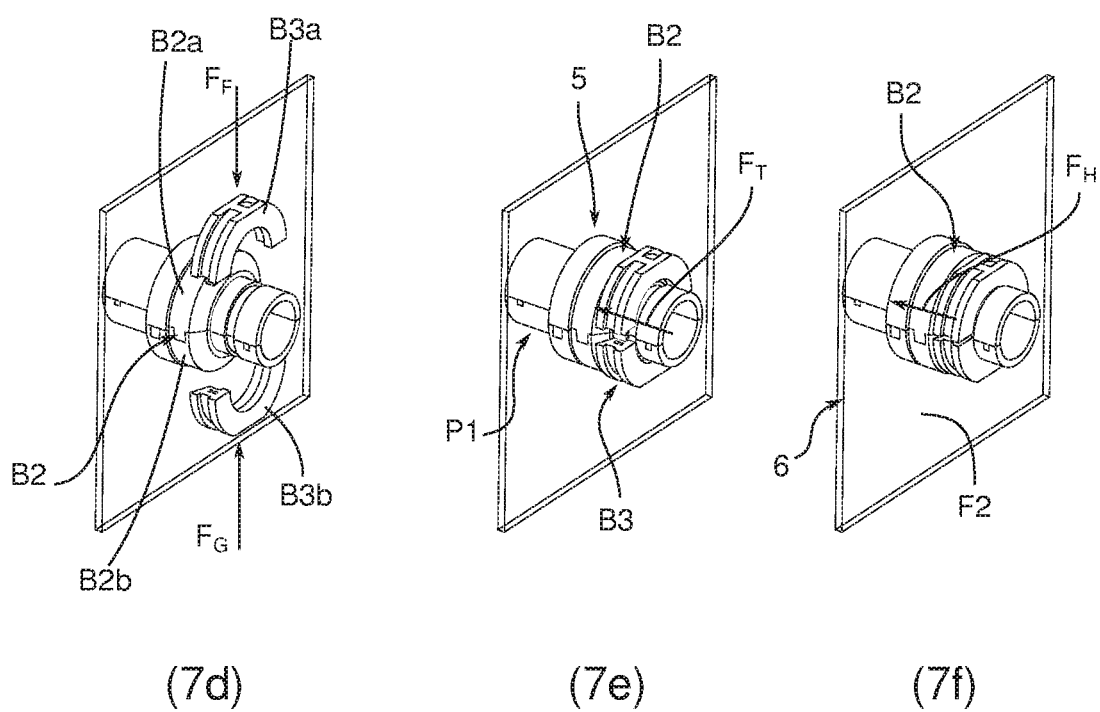

The steps of assembly and of positioning of the adaptor 5 against the partition 6 are broken down in the diagrams 7*a* to 7*f* of FIG. 7. The two half-shells 5A and 5B of the adaptor are assembled (converging arrows $F_A$ and $F_B$) on a side "A" of the partition 6 (diagram 7*a*) to pass through the orifice 60 of the partition 6. The half-rings B2*a*-B2*b* and B3*a*-B3*b* are positioned facing the other side "B" of the partition 6. Then (diagram 7*b*) the first part P1 of the adaptor 5 passes through the orifice 60 of the partition 6 (arrow $F_C$) until the positioning ring B1 of the second part P2 comes into contact against the face F1 of the partition 6.

The two half-rings B2*a* and B2*b* are then assembled (converging arrows $F_D$ and $F_E$ of diagram 7*c*) on the other side "B" of the partition 6 around the first part P1. Once the half-rings B2*a* and B2*b* are snap-fitted to form the blocking ring B2 (diagram 7*d*), the blocking half-rings B3*a* and B3*b* are assembled (converging arrows $F_F$ and $F_G$ of diagram 7*d*) to form the blocking ring B3 in the groove G1 (see FIG. 4) of the first part P1 of the adaptor 5 (diagram 7*e*).

In this assembly, the blocking ring B3 exerts a lateral translational pressure (arrow $F_T$) on the blocking ring B2 because of their inclined contact walls and the anchoring of the blocking ring B3 in the groove G1 (see FIG. 4). In these conditions, the blocking ring B2 is displaced translationally (see arrow $F_H$ of diagram 7*f*) and then comes to bear against the face F2 of the partition 6.

The invention is not limited to the exemplary embodiments described or represented. For example, the blocking mechanism can be implemented by a single blocking ring arranged against the partition and compressed by a clamping collar, or by the pressure exerted by two blocking rings with inclined contact walls, as detailed in the exemplary embodiment.

The translational coupling bore between the bores of the first and second parts of the adaptor can form a surface with a change of curvature, or in steps or even one that is not linearly progressive.

Moreover, the heat-resistant plastic material of the adaptor, that can be used in 3D printing, is chosen from among materials based on thermoplastic polyimides, for example the polyetherimides (called PEI), PLA (polylactic acid), ABS (acrylonitrile butadiene styrene), polyamides, in particular "PA 66", alumide (a combination of polyamide and aluminum), thermoplastic or thermosetting resins, PEEK (polyetheretherketone), and composite plastics.

The invention claimed is:

1. A cable harness output adaptor (5) for a cable tray (1) forming a cylindrical piece extending along at least one longitudinal axis (X'X, Y'Y) and defining two cylindrical parts (P1, P2), a first cylindrical part (P1) for internal cable harness support (3), and a second, cylindrical output part (P2) with external grip (20) of at least one protective sheath (4) of the cable harness (3), the cable harness output adaptor (5) comprising:
    two semi-cylindrical half-shells (5A, 5B) made of plastic material, assembled in a complementary manner to form a cylindrical shape, in that two snap-fitted positioning half-rings (B1*a*, B1*b*) for a positioning ring (B1) for the adaptor (5) coming from the half-shells (5A, 5B) at the second, external grip part (P2), and in that two snap-fitted blocking half-rings (B3*a*, B3*b*) for a blocking ring (B3) around a groove (G1) hollowed out on the first cylindrical part (P1), the blocking ring (B3) being compressed by a clamping collar (9).

2. The adaptor as claimed in claim 1, wherein the cylindrical parts (P1, P2) comprise cylindrical internal bores of circular base (51, 52) along a protective strip (7), the internal bore (52) of the second, cable harness output part (P2) with external grip (20) having a diameter greater than the first part (P1) for internal support of the cable harness (3).

3. The adaptor as claimed in claim 2, wherein the bores (51, 52) of the cylindrical parts (P1, P2) are coupled by a transitional bore (50) situated in the second, cable harness output part (P2).

4. The adaptor as claimed in claim 3, wherein the transitional bore (50) has a linearly progressive diameter situated in the second, cable harness output part (P2).

5. The adaptor as claimed in claim 1, wherein a second blocking ring (B2) formed by two snap-fitted half-rings (B2*a*, B2*b*) is arranged between the first blocking ring (B3) and the positioning ring (B1) of the first part (P1) of the adaptor (5).

6. The link adaptor as claimed in claim 1, wherein the second, cable harness output part (P2) forms an angle of between 0 and 90° with the first, internal support part (P1).

7. The adaptor as claimed in claim 6, wherein the second, cable harness output part (P2) is coupled to two protective sheaths of the cable harness (3), a metal sheet and an EMI protection sheet (4), advantageously fitted with an overbraiding.

8. The adaptor as claimed in claim 1, wherein the plastic material is composed of additive layers produced by 3D printing and covered with a metal, EMI protection deposition.

9. The adaptor as claimed in claim 1, wherein the plastic material is chosen from among the materials based on thermoplastic polyimides, for example the polyetherimides (called PEI), PLA (polylactic acid), ABS (acrylonitrile butadiene styrene), polyamides, in particular "PA 66", alumide (combination of polyamide and of aluminum), thermoplastic or thermosetting resins, PEEK (polyetheretherketone), and composite plastics.

10. The adaptor as claimed in claim 2, wherein the protective strip (7) of the cable harness (3) at the internal bores (51, 52) is composed of a material chosen from among a fabric sheath, a heat-shrinkable material and a self-amalgamating material.

11. An aircraft equipped with cable trays (1) and cable harness output adaptors (5) as claimed in claim 1, wherein the cable harnesses (3) are distributed at the output of the cable trays (1) to different avionic systems in order to supply them with electrical power.

12. A method for installing a cable harness adaptor as claimed in any one of claims 2 to 8 at the output of a cable tray (1), the method comprising the steps of:
   forming the cable harness (3) by the selection of cables (2) of the cable tray (1);
   jacketing a portion of the cable harness (3) with a protective strip (7), of a length greater than the length of the adaptor (5), at a location predefined by the final positioning of the adaptor (5);
   assembling the two half-shells (5A, 5B) of the adaptor (5) around the protective strip (7);
   fitting at least one protective sheath (4) over the cable harness (3) at the output of the adaptor (5) by gripcoupling (20) on the second, cable harness output part (P2) and introducing the cable harness (3) into an orifice (60) of a partition serving as support (6);
   positioning the adaptor (5) in the orifice (660) of the partition (6) so that the positioning ring (B1) of the second, cable harness output part (P2) comes into contact against a first face (F1) of the partition (6);
   snap-fitting the blocking half-rings (B3a, B3b) to form the blocking ring (B3) in the groove (G1) of the first, internal cable harness support part (P1) and consolidating the positioning of the adaptor (5) by pressing this blocking ring (B3) against the second face (F2) of the partition (6), and compressing the blocking ring (B3) by the clamping collar (9) against the partition (6).

13. The method as claimed in claim 12, wherein two half-rings (B2a, B2b) of a second blocking ring (B2) are snap-fitted around the first, internal cable harness support part (P1) between the partition (6) and the first blocking ring (B3) so that the adjustment by snap-fitting of the first blocking ring (B3) clamps the second blocking ring (B2) against the second face (F2) of the partition.

14. The method as claimed in claim 13, wherein the clamping of the second blocking ring (B2) is provoked ($F_H$) by the pressure exerted on inclined complementary walls (L2, L3) of the two blocking rings (B2, B3).

* * * * *